United States Patent
Bhaskar et al.

(10) Patent No.: US 11,314,521 B2
(45) Date of Patent: Apr. 26, 2022

(54) SYSTEM AND METHOD FOR MANAGING COMPONENT UPDATES

(71) Applicant: Dell Products L.P., Hopkinton, MA (US)

(72) Inventors: Anusha Bhaskar, Bengaluru (IN); Raveendra Madala, Bangalore (IN); Krishnakumar Narasimhan, Chennai (IN); Santosh Gore, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 16/773,171

(22) Filed: Jan. 27, 2020

(65) Prior Publication Data

US 2021/0232403 A1 Jul. 29, 2021

(51) Int. Cl.
*G06F 9/44* (2018.01)
*G06F 9/4401* (2018.01)
*G06F 1/26* (2006.01)
*G06F 8/65* (2018.01)

(52) U.S. Cl.
CPC .............. *G06F 9/4401* (2013.01); *G06F 1/26* (2013.01); *G06F 8/65* (2013.01)

(58) Field of Classification Search
CPC .............. G06F 9/4401; G06F 1/26; G06F 8/65
See application file for complete search history.

(56) References Cited

U.S. PATENT DOCUMENTS

| | | | |
|---|---|---|---|
| 6,708,231 B1 | 3/2004 | Kitagawa | |
| 7,953,913 B2 | 5/2011 | Perry et al. | |
| 8,539,213 B2 | 9/2013 | Zhang et al. | |
| 9,996,142 B2 | 6/2018 | Bulusu et al. | |
| 10,177,997 B1 | 1/2019 | Bromberg et al. | |
| 10,204,011 B1* | 2/2019 | Burriss | G06F 9/4401 |
| 10,324,864 B2* | 6/2019 | Lee | G06F 12/1441 |
| 2003/0204710 A1* | 10/2003 | Culter | G06F 9/4411 |
| | | | 713/1 |
| 2005/0144609 A1 | 6/2005 | Rothman et al. | |
| 2008/0072026 A1 | 3/2008 | Allison et al. | |
| 2009/0007089 A1 | 1/2009 | Rothman et al. | |
| 2009/0077407 A1* | 3/2009 | Akimoto | G06F 1/26 |
| | | | 713/340 |
| 2009/0307475 A1 | 12/2009 | Fried | |
| 2011/0107073 A1 | 5/2011 | Dalton et al. | |
| 2011/0143809 A1 | 6/2011 | Salomone et al. | |
| 2011/0238969 A1 | 9/2011 | Warkentin et al. | |
| 2013/0268922 A1 | 10/2013 | Tiwari et al. | |
| 2014/0157264 A1 | 6/2014 | Russinovich et al. | |

(Continued)

*Primary Examiner* — Zahid Choudhury
(74) *Attorney, Agent, or Firm* — Chamberlain, Hrdlicka, White, Williams & Aughtry (57) ABSTRACT

An asset includes physical computing resources and a physical computing resources manager. The physical computing resources manager obtains a power management update for a physical computing resource of the physical computing resources of the asset; in response to obtaining the power management update: obtains, using an out-of-band manager, a power management descriptor for the asset; updates the power management descriptor based on the power management update; stages the power management descriptor at a location; and performs a low resource consumption reboot using the location to implement the power management update.

14 Claims, 8 Drawing Sheets

(56) References Cited

U.S. PATENT DOCUMENTS

| | | |
|---|---|---|
| 2015/0178097 A1 | 6/2015 | Russinovich |
| 2016/0266894 A1 | 9/2016 | Panicker et al. |
| 2017/0357500 A1 | 12/2017 | Vidyadhara et al. |
| 2019/0004977 A1 | 1/2019 | Fanara et al. |
| 2019/0042506 A1 | 2/2019 | Devey et al. |
| 2019/0079748 A1 | 3/2019 | Chu et al. |
| 2019/0199884 A1 | 6/2019 | Shimamura et al. |
| 2019/0334909 A1 | 10/2019 | Schmitt et al. |
| 2020/0067922 A1 | 2/2020 | Avetisov et al. |
| 2020/0218544 A1 | 7/2020 | Ganesan et al. |
| 2020/0218545 A1* | 7/2020 | Ganesan ............. G06F 11/1433 |
| 2020/0220783 A1 | 7/2020 | Michaud et al. |
| 2020/0333870 A1* | 10/2020 | Vaysman ............... G06F 1/3225 |
| 2021/0232404 A1* | 7/2021 | Gore .................... G06F 9/4401 |

* cited by examiner

SYSTEM AND METHOD FOR MANAGING COMPONENT UPDATES

BACKGROUND

Computing devices may perform services. To provide the services, the computing devices may include hardware components and software components. Overtime, the operation of the hardware components and/or the software components may be updated to change the operation of the computing devices.

SUMMARY

In one aspect, an asset in accordance with one or more embodiments of the invention includes physical computing resources and a physical computing resources manager. The physical computing resources manager obtains a power management update for a physical computing resource of the physical computing resources of the asset; in response to obtaining the power management update: obtains, using an out-of-band manager, a power management descriptor for the asset; updates the power management descriptor based on the power management update; stages the power management descriptor at a location; and performs a low resource consumption reboot using the location to implement the power management update.

In one aspect, a method for managing an asset in accordance with one or more embodiments of the invention includes obtaining a power management update for a physical computing resource of physical computing resources of the asset; in response to obtaining the power management update: obtaining, using an out-of-band manager, a power management descriptor for the asset; updating the power management descriptor based on the power management update; staging the power management descriptor at a location; and performing a low resource consumption reboot using the location to implement the power management update.

In one aspect, a non-transitory computer readable medium in accordance with one or more embodiments of the invention includes computer readable program code, which when executed by a computer processor enables the computer processor to perform a method for managing an asset. The method includes obtaining a power management update for a physical computing resource of physical computing resources of the asset; in response to obtaining the power management update: obtaining, using an out-of-band manager, a power management descriptor for the asset; updating the power management descriptor based on the power management update; staging the power management descriptor at a location; and performing a low resource consumption reboot using the location to implement the power management update.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3.1 shows a flowchart of a method of implementing a power management update during a low resource consumption reboot in accordance with one or more embodiments of the invention.

FIG. 3.2 shows a flowchart of a method of implementing a firmware update during a low resource consumption reboot in accordance with one or more embodiments of the invention.

FIG. 4.1 shows a diagram of an example system at a first point in time.

FIGS. 4.2-4.3 show diagrams of interactions between and actions performed by components of the example system of FIG. 4.1 over time.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for updating computing devices. Updating a computing device may change its operation. For example, the manner in which the hardware and/or software components of the computing device may operate in different manners after an update is applied when compared to the manner in which the aforementioned components operated prior to being updated.

A computing device may be updated by, for example, modifying the configuration (e.g., power management) of hardware components, modifying the firmware, which governs the operation of the hardware components, modifying software components, etc. If updates are not applied, the computing devices may be rendered less efficient, unable to provide certain functionalities, or may otherwise operate in different manners had the updates been applied.

A computing device in accordance with embodiments of the invention may preferentially perform low resource consumption boots/reboots. A low resource consumption reboot may be a manner of restarting a computing device that avoids the majority of the steps performed during high resource consumption reboots/boots. The avoided steps may include, for example, one or more of (i) performing an inventory of a computing device, (ii) performing a Power-On Self Test (POST) of the computing device, (iii) identifying a startup component (e.g., a boot device that manages the process of placing components of the computing device in predetermined states) of the computing device, (iv) updating information (e.g., ACPI/SMBIOS) used to manage components of the computing device, (v) loading a manager (e.g., an operating system) of the components of the computing device, (vi) placing entities (e.g., applications) in control of the computing device to facilitate providing of computer implemented services, and (vii) restarting/resetting components of the computing device to cause them to load firmware, update setting, or otherwise modify their operation. By avoiding a portion of the aforementioned steps, the time for performing a low resource consumption reboot may be substantially lower than that required to perform a high resource consumption reboot during which a majority (or all) of the aforementioned steps are performed. Consequently, the uptime of the computing device may be greatly improved by preferentially performing low resource consumption boots/reboots.

However, performing a low resource consumption reboot may avoid performance of steps that may be required for applying updates to the computing device. For example, data structures that govern how hardware components of the computing device are abstracted for use by applications may not be updated based on updates. Consequently, updates may not be applied when low resource consumption reboots are performed.

Embodiments of the invention may provide methods and systems for ensuring that updates are applied during low resource consumption boots/reboots. Specifically, embodiments of the invention may provide methods and systems that (i) identify the presence of updates, (ii) prior to performing an update, modify the data structures that govern how hardware components of the computing device are abstracted prior to performing a low resource consumption reboot based on the identified updates (e.g., one or more updates), and (iii) resulting in the updates being applied during the low resource consumption reboot by virtue of the updated data structures being present during the low resource consumption reboot.

By doing so, embodiments of the invention may provide a system that ensures updates are applied to computing devices even when low computing resource consumption reboots are preferentially performed. Consequently, the security of the computing device may be improved while reducing the cognitive burden on users of the computing device for actively selecting and performing different types of reboots (e.g., high resource consumption reboots when updates are present but not applied) to cause updates to be applied.

Figure 1:
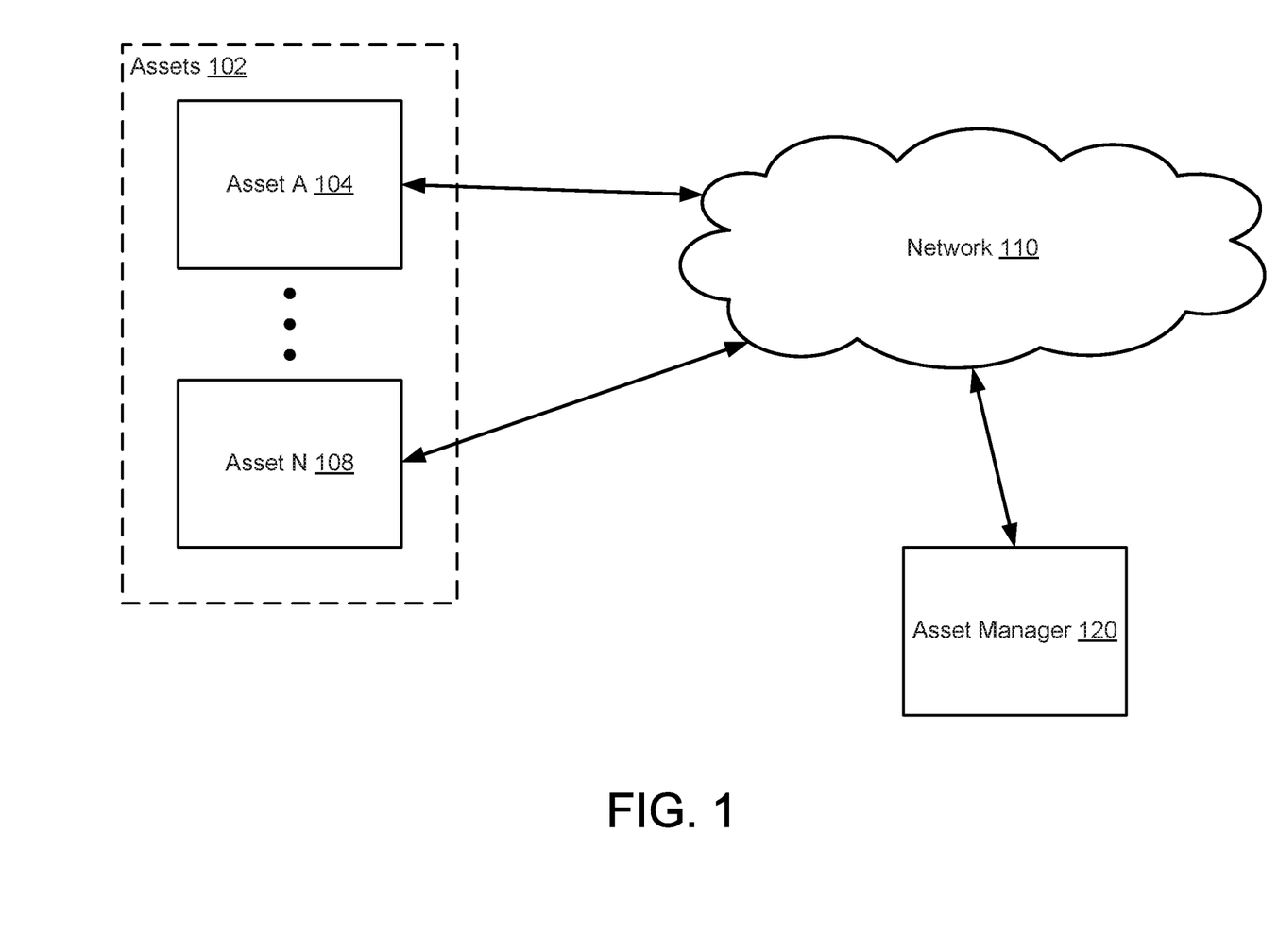
FIG. 1 shows a diagram of a system in accordance with one or more embodiments of the invention.

FIG. 1 shows a system in accordance with one or more embodiments of the invention. The system may include any number of assets (102) that provides computer implemented services. The computer implemented services may include, for example, database services, data storage services, electronic communications services, and/or other types of services that may be implemented using computing devices.

Any number of the assets (e.g., 104, 108) may operate independently or cooperatively to provide the computer implemented services. For example, a single asset (e.g., 104) may provide a computer implemented service on its own (i.e., independently) while multiple other assets may provide a second computer implemented service cooperatively.

To provide the computer implemented services, the assets may utilize computing resources provided by hardware devices of the assets. The computing resources may include, for example, processing resources, storage resources, memory resources, and/or communications resources provided by the hardware devices.

The operation of the assets (102) may be modified at any point in time. For example, the operation of the assets (102) may be modified to provide different computer implemented service, more efficiently utilize computing resources, address deficiencies in provided computer implemented services, or for other reasons.

The system may include an asset manager (120) that manages the operation of the assets (102). To manage the assets (102), the asset manager (120) may send updates to the assets that, when implemented by the assets, modifies the manner in which the assets operate.

When operating and/or to update their operation, the assets (102) may need to be rebooted. Rebooting may refer to a process of placing an asset in a predetermined state. Depending on the predetermined state, performing a reboot may be a computational, time, and/or energy expensive or inexpensive process.

Depending on the desired state, rebooting may include one or more of (i) powering up the asset, (ii) performing an inventory of an asset, (iii) performing a Power-On Self Test (POST) of the asset, (iv) identifying a startup component (e.g., a boot device that manages the process of placing components of the asset in predetermined states) of the asset, (v) loading information (e.g., ACPI/SMBIOS) used to manage components of the asset, (vi) loading a manager (e.g., an operating system) of the components of the asset, (vii) placing entities (e.g., applications) in control of the asset to facilitate providing of computer implemented services, and (viii) restarting/resetting components of the asset to cause them to load firmware, update setting, or otherwise modify their operation. Depending on the number of the aforementioned processes performed as part of a rebooting, the rebooting may be a high computational cost reboot or a low computational cost reboot resulting in the asset being placed in corresponding states.

For example, performing a reboot that includes all of the aforementioned processes (e.g., a high resource consumption boot) may be computationally expensive and time consuming. However, doing so may place the asset in a state that matches a desired state based on, for example, updates to the operation of the asset that have been obtained by the asset. In contrast, performing a reboot that includes only a portion of the aforementioned processes (e.g., a low resource consumption reboot) may be comparatively computationally inexpensive and/or quick. However, doing so may place the asset in a state that does not match the desired state based on, for example, updates to the operation of the asset that have been obtained by the asset.

Embodiments of the invention may provide a system and method for performing a modified low resource consumption reboot of an asset that results in the state of the asset more closely matching a desired state of the asset than would be achieved if only a low resource consumption reboot of the asset is performed. To do so, the system may monitor obtained updates for the asset to identify a portion of the physical computing resources of the asset that need to be reset in order to implement the updates and selectively modify information used to the reboot process based on the updates before completing a reboot. By doing so, the updated information may be used during the reboot process resulting in the implementation of the updates while enabling low resource consumption reboots to be performed (rather than requiring high resource consumption reboots to be performed to implement the updates).

The components of the system of FIG. 1 may be operably connected to each other and/or other entities via any combination of wired and/or wireless network. For example, the aforementioned components may each be operably connected to a network (110) that facilitates communications between these components. Each of the components of the system of FIG. 1 are discussed below.

The assets (102) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the assets (102) described in this application and/or all, or a portion, of the methods illustrated in FIGS. 3.1-3.2. The assets (102) may be implemented using other types of computing devices without departing from the invention. For additional details regarding computing devices, refer to FIG. 5.

As noted above, the assets (102) may provide computer implemented services. To do so, the assets (102) may utilize computing resources of the asset. To utilize the computing resources of the assets, the assets (102) may manage the hardware components of the assets that provide the computing resources. Management of hardware components may include using information included in, for example, tables during boot processes to operate the devices. If the information included in the tables is not updated to reflect obtained updates that modify the operation of the hardware components, the operation of the hardware components may not be updated.

To reduce the computational cost for rebooting, the assets (102) may selectively perform low computational cost reboots and modified low computational cost reboots. Specifically, the assets (102) may preferentially perform low computational cost reboots over modified low computational cost reboots (e.g., reboots during which components of the assets are restarted) and/or high resource consumption reboots. The assets (102) may perform modified low computational cost reboots when updates or other changes to the operation of the assets (102) require that the assets (102) restart the components of the assets for the new operations of the assets (102) to be performed.

For example, the assets (102) may obtain updates (e.g., stage the updates in storage for application) to their operation that may necessitate a restart of the assets to take effect during which tables or other types of data structures that govern how the hardware devices of the assets will operate. However, if a low resource consumption reboot is performed, the obtained updates may not be applied to the tables or other data structures resulting in the updates not being applied when a low computing resource update is performed.

To ensure that updates are implemented, the assets may (i) identify when updates are obtained that require tables to be updates (or other types of data structures) and a reboot to be performed to implement the updates, (ii) obtain a copy of the tables that need to be update, (iii) modify the tables to reflect the updates, and (iv) an perform a low resource consumption update using the modified tables to implement the updates. By doing so, the computational cost for performing updates may be reduced while still ensuring that updates requiring modification of tables or other data structures that govern how hardware components will be operated are implemented.

By performing low resource consumption reboots user tables that were updated prior to performing the reboots, an asset in accordance with embodiments of the invention may modify its state in a manner consistent with previously obtained updates while reducing the computational cost for performing such reboots. For example, by avoiding performance of high resource consumption reboots the assets in accordance with embodiments of the invention may provide higher uptime while ensuring that the assets operate in desired manners by placing the assets in predetermined states following low resource consumption reboots.

The assets (102) provides any number of computer implemented services. The computer implemented services may include, for example, file storage services, database services, electronic communication services, etc. The assets (102) may provide other types of computer implemented services without departing from the invention. Each of the assets (e.g., 104, 108) of the assets (102) may provide similar and/or different computer implemented services.

Figure 2:
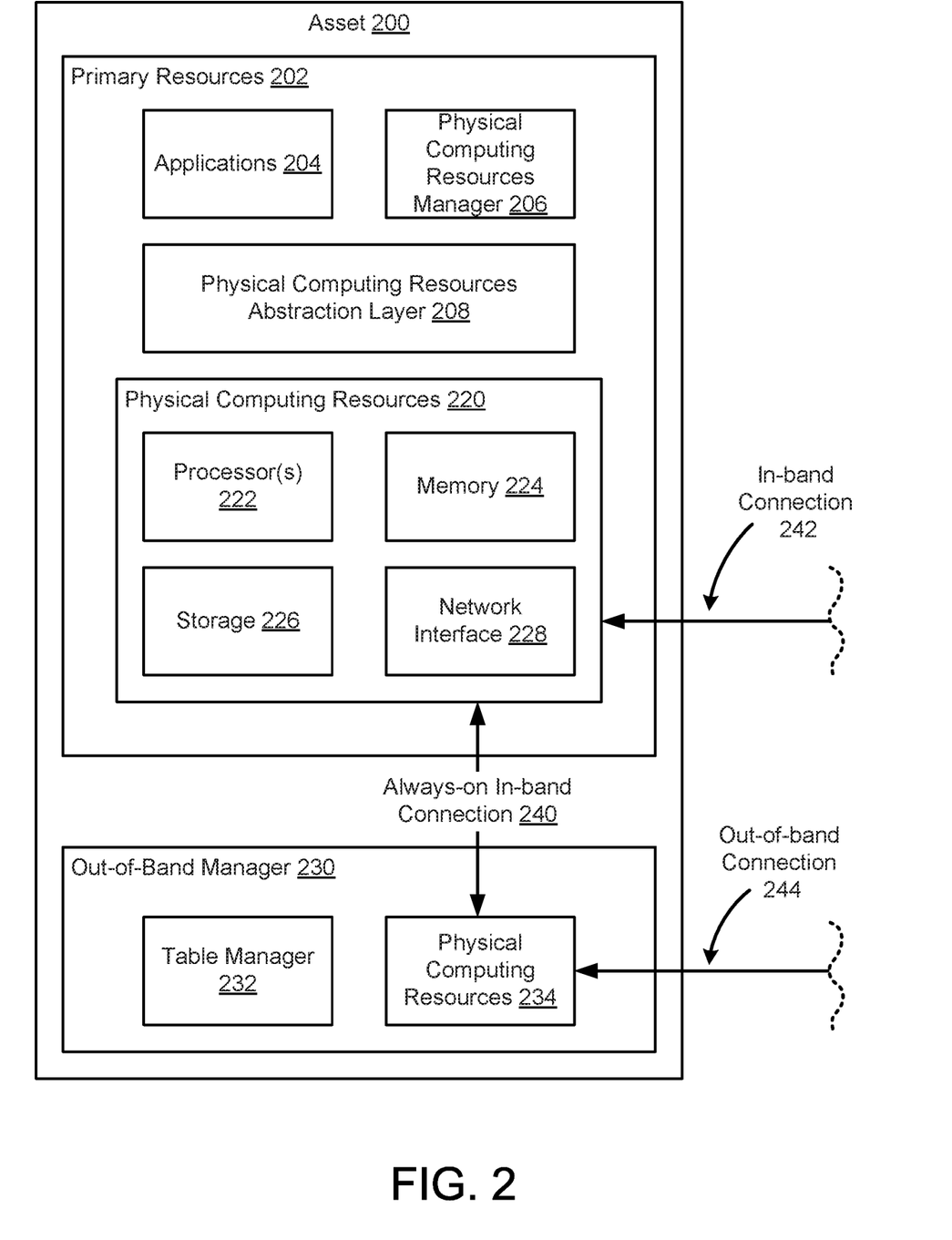
FIG. 2 shows a diagram of an example asset in accordance with one or more embodiments of the invention.

For additional details regarding assets (102), refer to FIG. 2.

The asset manager (120) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the asset manager (120) described in this application and/or all, or a portion, of the methods illustrated in FIGS. 3.1-3.2. The asset manager (120) may be implemented using other types of computing devices without departing from the invention. For additional details regarding computing devices, refer to FIG. 5.

The asset manager (120) may be implemented using logical devices without departing from the invention. For example, the asset manager (120) may be implemented using virtual machines that utilize computing resources of any number of physical computing devices (e.g., refer to FIG. 5) to provide their respective functionalities. The asset manager (120) may be implemented using other types of logical devices without departing from the invention.

While illustrated as a separate entity, the functionality of the asset manager (120) may be implemented via the assets (102). For example, the asset manager (120) may be implemented as a distributed application that executes using the computing resources of the other components of the system of FIG. 1 and/or computing resources of other entities not illustrated in FIG. 1.

In one or more embodiments of the invention, the asset manager (120) provides asset management services. Asset management services may include (i) identifying changes that are to be made to the operation of one or more of the assets (102) (e.g., changes in power capabilities, firmware updates, new software, patches to hosted software, etc.), (ii) distributing the changes (and/or information that enables changes to be made) to the one or more of the assets (102), and/or (iii) verifying that the changes have been made to the operation of the one or more assets (102).

While the system is illustrated in FIG. 1 as including a limited number of specific components, a system in accordance with embodiments of the invention may include additional, fewer, and/or different components from those illustrated in FIG. 1 and/or discussed above without departing from the invention.

As discussed above, assets may proactively take action prior to performing reboots to provide computer implemented services in a predetermined manner by ensuring obtained updates are implemented. FIG. 2 shows a diagram of an example asset (200) in accordance with one or more embodiments of the invention. The example asset (200) may be similar to any of the assets (102) illustrated in FIG. 1.

As discussed above, the example asset (200) may (i) provide computer implemented and (ii) take action prior to and/or during reboots to implement updates to the operation of the example asset (200).

The example asset (200) may provide any number of computer implemented services. Each of the computer implemented services may provide similar and/or different functionality.

To provide the computer implemented services, the example asset (200) may host any number of applications (204). The applications (204) may include any number and/or type of applications that are hosted by the primary resources (202). In other word, the applications (204) may execute using the physical computing resources (220) of the primary resources (202). The physical computing resources (220) may be provided using hardware devices including processor(s) (222), memory (224), persistent storage (226), and/or a network interface (228).

For example, the applications (204) may be implemented as computer code, i.e., computer instructions, that when executed by one or more processors (e.g., 222) of the primary resources (202) give rise to the functionality of the applications (204). The computer code corresponding to each of the applications (204) may be stored on the persistent storage (226) of the physical computing resources (220) or in other locations (e.g., locally on other persistent storage or remotely on other devices).

The applications (204) may provide any quantity and type of computer implemented services. A computer implemented service may be, for example, electronic communications services, data management services, database services, etc. Any number and type (local and/or remote) of entities may utilize the computer implemented services provided by the applications (204).

For example, an application hosted by the primary resources (202) may provide electronic mail services to an entity that is remote to the example asset (200). In another example, an application hosted by the primary resources (202) may provide database services to other applications hosted by the primary resources (202) and additional applications hosted by other data processing devices operably connected to the example asset (200).

In some embodiments of the invention, the applications include virtual machines that, in turn, host other applications that provide the computer implemented services.

To implement updates while performing low resource consumption reboots, the example asset (200) may include a physical computing resources manager (206) that enables remote entities (e.g., the asset manager discussed in FIG. 1) to provide it with updates to its operation. The updates may be, for example, firmware updates, software updates, changes in configuration of software and/or hardware components, etc.

When the aforementioned updates are obtained, the physical computing resources manager (206) may stage the updates for implementation. Staging may include storing the updates in predetermined locations where corresponding components will look when updating their operation.

The physical computing resources manager (206) may also obtain copies of tables or other data structures used during reboots performed by the example asset (200). The tables may govern the operation of the physical computing resources (220) after performance of the reboots. Consequently, if the tables are not updated prior to or during a reboot, updates that were previously obtained may not be implemented. For example, the tables may include any table of an advanced configuration power interface (ACPI) table such as a secondary system descriptor table (SSDT), and extensible firmware interface system reference table (ESRT).

For example, the SSDT may be updated to change the manner in which hardware components of the asset are operated from a power point of view. The SSDT table may include information that enables different power profiles, different power modes, or otherwise impact the power consumption and user behavior of a hardware component.

In another example, the ESRT table may be updated to cause updates to firmware of devices to be deployed. As part of the low resource consumption boot process, the ESRT table may be read which may cause a boot loader or other type of boot software to identify the location and/or other information regarding firmware updates and/or apply the firmware to a corresponding device.

Accordingly, to change the power and/or firmware characteristics of hardware devices employed may the example asset, the SSDT and/or ESRT table may need to be updated prior to or as part of the boot process. However, performing a low resource consumption boot may not include updating either of these tables. Consequently, obtained updates may not be applied if no other actions are taking (other than performing a boot.

To ensure that updates are applied, as noted above, the physical computing resources manager (206) may update the aforementioned tables and/or create new tables that will be used during a low resource consumption boot to cause obtained updates to be applied by the process of performing the low resource consumption boot.

To enable the applications (204) to efficiently utilize the physical computing resources (220), the example asset (200) may include a physical computing resources abstraction layer (208). The physical computing resources abstraction layer (208) may manage the physical computing resources (220) for use by the applications (204) and/or other entities). Managing the physical computing resources (220) may include performing different types of reboots The physical computing resources abstraction layer (208) may include, for example, a basic input output system (BIOS), any number of boot loaders, any number of operating systems, and/or a hypervisor and/or other software layers if any of the applications (204) are implemented using virtual machines. The aforementioned components may be adapted to perform (i) high resource consumption boots and (ii) low resource consumption boots).

When performing the high resource consumption boots, the physical computing resources abstraction layer (208) may (i) update and (ii) use the tables that govern the behavior of the hardware components of the physical computing resources (220). In contrast, when performing the low resource consumption boots, the physical computing resources abstraction layer (208) may only use the tables that govern the behavior of the hardware components of the physical computing resources (220). In other words, the tables are not updated as part of the boot process when a low resource consumption boot is performed. The physical computing resources abstraction layer (208) may preferentially perform low consumption resource reboots to minimize computational cost for performing boots.

In one or more embodiments of the invention, the physical computing resources manager (206) and/or the physical computing resources abstraction layer (208) is implemented using a hardware device including circuitry. The hardware device may be, for example, a digital signal processor, a field programmable gate array, or an application specific integrated circuit. The physical computing resources manager (206) and/or physical computing resources abstraction layer (208) may be other types of hardware devices without departing from the invention.

In one or more embodiments of the invention, the physical computing resources manager (206) and/or physical computing resources abstraction layer (208) is implemented using computing code stored on a persistent storage (e.g., 226) that when executed by a processor performs the functionality of the physical computing resources manager (206) and/or physical computing resources abstraction layer (208). The processor may be a hardware processor (e.g., 222) including circuitry such as, for example, a central processing unit or a microcontroller. The processor may be other types of hardware devices for processing digital information without departing from the invention.

The example asset (200) may include an out-of-band manager (230). The out-of-band manager (230) may facilitate updating of tables that govern the operation of the hardware components of the physical computing resources (220). To do so, the out-of-band manager (230) may (i) obtain a copy of table stored in the primary resources (202) and (ii) provide table to the physical computing resources manager and/or other entities for updating.

To provide the aforementioned functionality, the out-of-band manager (230) may be operably connected to the primary resources (202) of the example asset (200) via an always-on in-band connection (240). The always-on in-band connection (240) may enable the primary resources (202) and the out-of-band manager (230) to communicate with each other without using the in-band connection (242) or the out-of-band connection (244) that are used by the aforementioned components of the example asset (200) to communicate with other entities.

To provide its functionality, the out-of-band manager (230) may include a table manager (232) and physical computing resources (234). The table manager (232) may provide the functionality of the out-of-band manager, discussed above. The out-of-band manager (230) may utilize physical computing resources (234) of the out-of-band manager to provide its functionality. The physical computing resources (234) may include persistent storage (not shown) that may store computer code corresponding to the out-of-band manager (230) that when executed by processor(s) (not shown) of the physical computing resources (234) cause the table manager (232) to perform the functionality of the out-of-band manager (230).

The out-of-band manager (230) may be implemented as a hardware device. For example, the out-of-band manager (230) may be implemented as a circuit card hosted by the example asset (200) (e.g., a device on a bus that interconnects the physical computing resources (220)). The out-of-band manager (230) may operate as a computing device separate from the example asset (200).

The out-of-band manager (230) may be implemented as a logical entity. For example, the out-of-band manager (230) may be implemented using a virtual machine hosted by the example asset (200) (e.g., one of the applications (204) that utilizes virtual resources for its execution. In such a scenario, the out-of-band connection (244) and the always-on in-band connection (240) may be implemented as virtual connections supported by logical network interfaces maintained by the example asset (200). The primary resources (202) and the out-of-band manager (230) may each be allocated separate end points on a virtual network supported by the example asset (200).

While illustrated in FIG. 2 as being a portion of the example asset (200), the out-of-band manager (230) may be implemented as a separate physical device without departing from the invention. For example, the primary resources (202) of the example asset (200) may be implemented using a first rack mount server operably connected to a second rack mount server that is used to implement the out-of-band manager (230). The operable connection between the primary resources (202) and the out-of-band manager (230) may serve as an always-on in-band connection (240) while other interconnects serve as the in-band connection (242) and the out-of-band connection.

While the example asset (200) of FIG. 2 is illustrated as including a limited number of specific component, an asset in accordance with embodiments of the invention may include additional, fewer, and/or different components without departing from the invention.

Figure 31:
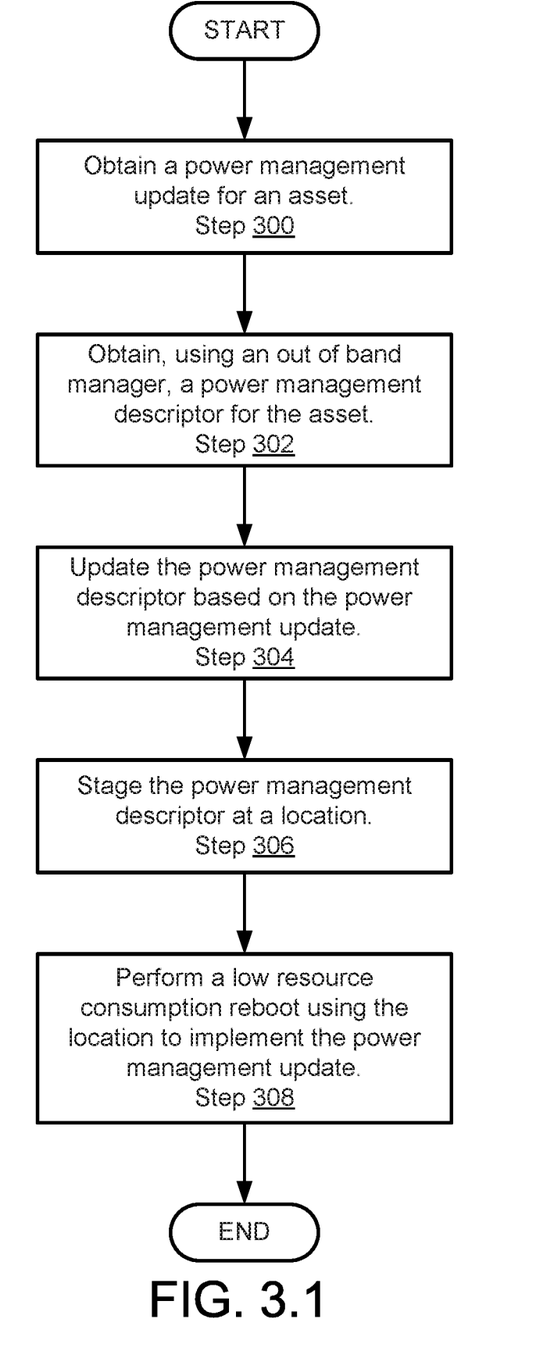
Figure 32:
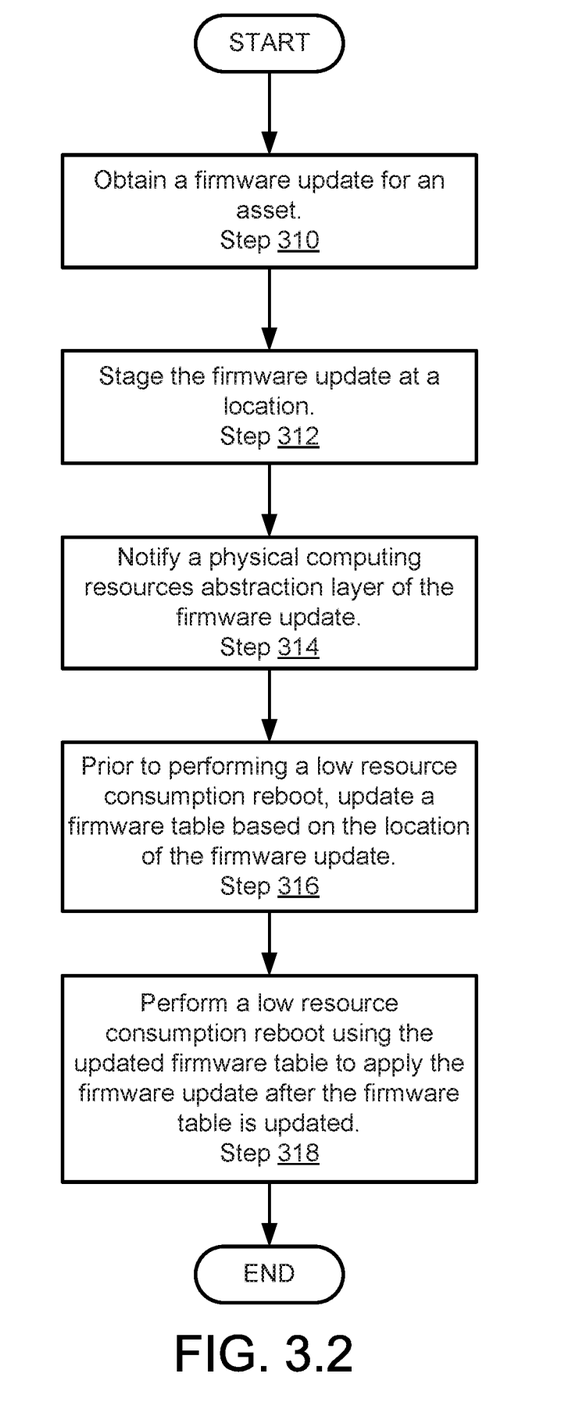

As discussed above, the system of FIG. 1 may manage the states of assets by updating information used during reboots in advance of performing reboots. FIGS. 3.1-3.2 show methods that may be performed by components of the system of FIG. 1 to manage the states of the assets.

FIG. 3.1 shows a flowchart of a method in accordance with one or more embodiments of the invention. The method depicted in FIG. 3.1 may be performed to reboot an asset in accordance with one or more embodiments of the invention. The method shown in FIG. 3.1 may be performed by, for example, an asset (e.g., 102, FIG. 1). Other components of the system in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, a power management update for an asset is obtained. The power management update may be a data structure that, when applied to the asset, modifies a power behavior of one or more hardware components of the asset. The hardware component may be, for example, a processor, a memory module, a hard disk drive, etc.

The power management update may be obtained from an asset manager, as described with respect to FIG. 1. For example, the asset manager may provide the power management update to the asset via a message sent via a network that operably connects the asset manager and the asset.

In step 302, a power management descriptor for the asset is obtained using an out-of-band manager. For example, a request may be sent to the power management descriptor to the out-of-band manager. In response, the out-of-band manager may obtain the power management descriptor.

The power management descriptor may be obtained, for example, from a boot loader, BIOS, or other portion of the physical computing resources abstraction layer of the asset. For example, the out-of-band manager may send a message to a component of the physical computing resources abstraction layer of the asset requesting that the power management descriptor be provided. The component may provide the power management descriptor in response to the request.

The power management update may be obtained, for example, while the asset is operating. In such a scenario, an operating system of the physical computing resources abstraction layer of the asset may be operating. To obtain the power management update, the operation of the asset may be temporarily suspended and an underlying entity such as the BIOS may directly service the request. For example, only the BIOS or another lower level management entity may have access to the power management descriptor.

In one or more embodiments of the invention, the power management descriptor is a SSDT table. The power management descriptor may be other types of data structures utilized by lower level management entities without departing from the invention. The power management descriptor may also, or alternatively, by utilized by an operating system or other type of higher-level management entity without departing from the invention.

In one or more embodiments of the invention, the power management update specifies one or more modifications to the power management properties of one or more hardware components. For example, the modification may be to change how the one or more hardware components are powered, how the component may be powered, may add new power capabilities (e.g., new power states), etc.

In step 304, the power management descriptor is updated based on the power management update. The power management descriptor may be updated to reflect the modifications included in the power management update.

For example, information may be added to the power management descriptor indicating a new or changed power management property of one or more hardware components of the physical computing resources of the primary resources of the asset.

In one or more embodiments of the invention, updating the power management descriptor includes modifying an SSDT table based on the power management update.

In step 306, the power management descriptor is stored at a location. The location may be, for example, in memory. The location may be, for example, in a portion of the memory utilized by one or more entities of the physical computing resources abstraction layer of the abstract for boot purposes. The location may be in persistent storage or other locations without departing from the invention.

In step 308, a low resource consumption reboot is performed using the location to implement the power management update.

In one or more embodiments of the invention, the location of the power management descriptor is a location that is read as part of the low resource consumption boot process. Consequently, the information included in the power management descriptor may be automatically used by one of the components (e.g., BIOS) of the physical computing resources abstraction layer. By doing so, the changes included in the power management update may be automatically implemented by virtue of the information included in the power management descriptor that is used as part of the low resource consumption reboot.

In one or more embodiments of the invention, the location of the power management descriptor is provided to a component of the physical computing resources abstraction layer prior to or as part of the low resource consumption reboot. The location may then be read as part of the low resource consumption boot process. Consequently, the information included in the power management descriptor may be automatically used by one of the components (e.g., BIOS) of the physical computing resources abstraction layer during the low resource consumption reboot. By doing so, the changes included in the power management update may be automatically implemented by virtue of the information included in the power management descriptor that is used as part of the low resource consumption reboot.

The method may end following step 300.

Thus, via the method illustrated in FIG. 3.1, an asset in accordance with embodiments of the invention may preferentially perform low resource consumption boots improving the uptime of the asset while ensuring that power management updates are applied to the asset.

FIG. 3.2 shows a flowchart of a method in accordance with one or more embodiments of the invention. The method depicted in FIG. 3.2 may be performed to reboot an asset in accordance with one or more embodiments of the invention while ensuring firmware updates are applied. The method shown in FIG. 3.2 may be performed by, for example, an asset (e.g., 102, FIG. 1). Other components of the system in FIG. 1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 310, a firmware update for an asset is obtained. The firmware update may be a data structure that, when applied to the asset, modifies firmware used by of one or more hardware components of the asset. The hardware component may be, for example, a processor, a memory module, a hard disk drive, etc.

The firmware update may be obtained from an asset manager, as described with respect to FIG. 1. For example, the asset manager may provide the firmware update to the asset via a message sent via a network that operably connects the asset manager and the asset.

In step 312, the firmware update is staged at a location. Staging the firmware update may include storing a copy of the firmware update at the location. The location may be a portion of storage, memory, or a portion of the physical computing resources of the out-of-band manager.

In step 314, a physical computing resources abstraction layer is notified of the firmware update. The physical computing resources abstraction layer may be notified by, for example, sending a message a component of the physical computing resources abstraction layer of the presence of the firmware update. The component may be, for example, a BIOS.

In step 316, prior to performing a low resource consumption reboot after the firmware update is staged, a firmware table is updated based on the location of the firmware update.

The firmware table may be updated, for example, by a boot loader, BIOS, or other portion of the physical computing resources abstraction layer of the asset. For example, the component may have obtained the notification of step 314. In response the notification and a signal indicating that a low resource consumption reboot of the asset is going to be performed (e.g., an operating system or other higher level entity sending a message that a reset is occurring), a BIOS reset handler or other BIOS entity may (i) identify a location of the firmware update via the message, (ii) transfer the firmware update to a secure region of memory or storage of the primary resources which are utilized by lower level management entities (e.g., BIOS, boot loaders, etc.) to abstract the physical computing resources of the primary resources, and (iii) update the firmware table based on the firmware update (e.g., add entries corresponding to it and/or information that will cause the update to be applied during the next low resource consumption reboot).

The firmware table may be, for example, an ESRT table that is utilized by lower level management entities during low resource consumption boots to apply firmware updates. If the ESRT table does not include information regarding the firmware update, the firmware update may not be applied during low resource consumption reboots.

In step 318, a lower resource consumption reboot is performed using the updated firmware table to apply the firmware update after the firmware table is updated. As discussed above, the firmware update may be automatically applied as part of the low resource consumption reboot so long as the firmware table is appropriately updated.

The method may end following step 318.

Thus, via the method illustrated in FIG. 3.2, an asset in accordance with embodiments of the invention may preferentially perform low resource consumption boots improving the uptime of the asset while ensuring that firmware updates are applied to the asset.

To further clarify embodiments of the invention, a non-limiting example is provided in FIGS. 4.1-4.3. FIG. 4.1 shows a system similar to that illustrated in FIG. 1. FIGS. 4.2-4.3 illustrate interactions between components and/or actions performed by the components of the system of FIG. 4.1 over time. For the sake of brevity, only a limited number of components of the system of FIG. 1 are illustrated in each of FIGS. 4.1-4.3.

EXAMPLE

Figure 41:
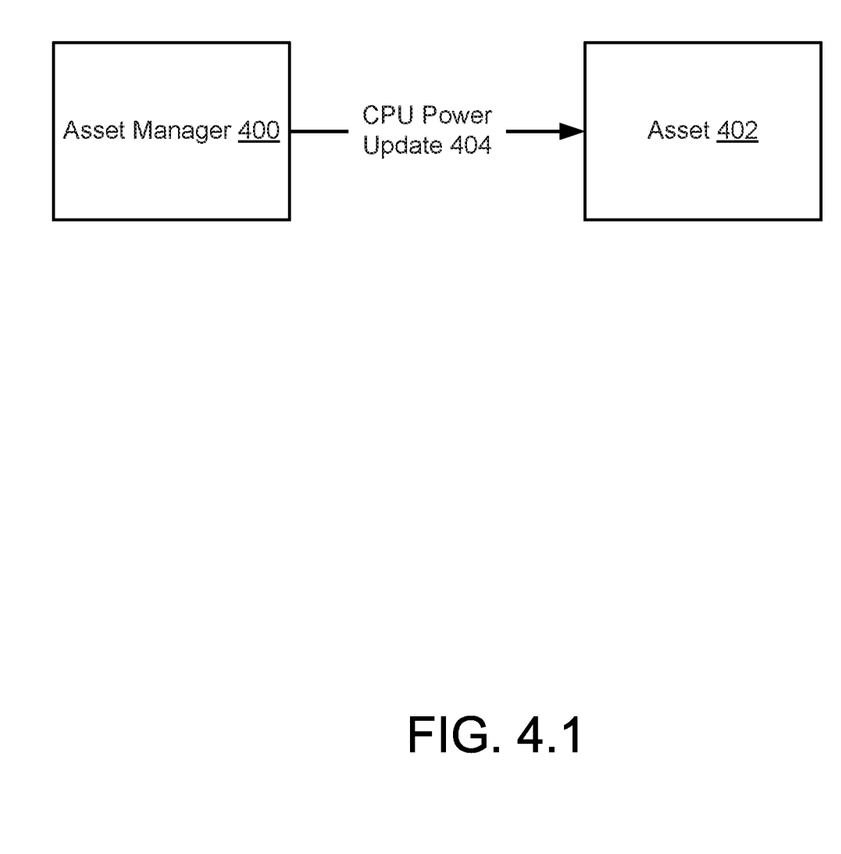

Consider a scenario as illustrated in FIG. 4.1 in which an asset (402) is being managed by an asset manager (400). At a first point in time, the asset manager (400) obtains a CPU power update (404) for the asset (402). The CPU power update (404) may be an update for a processor of the asset (402) that modifies the manner in which power is provided to the processor during its operation. To manage the asset (402), the asset manager (400) provides the asset (402) with a copy of the CPU power update (404).

Figure 42:
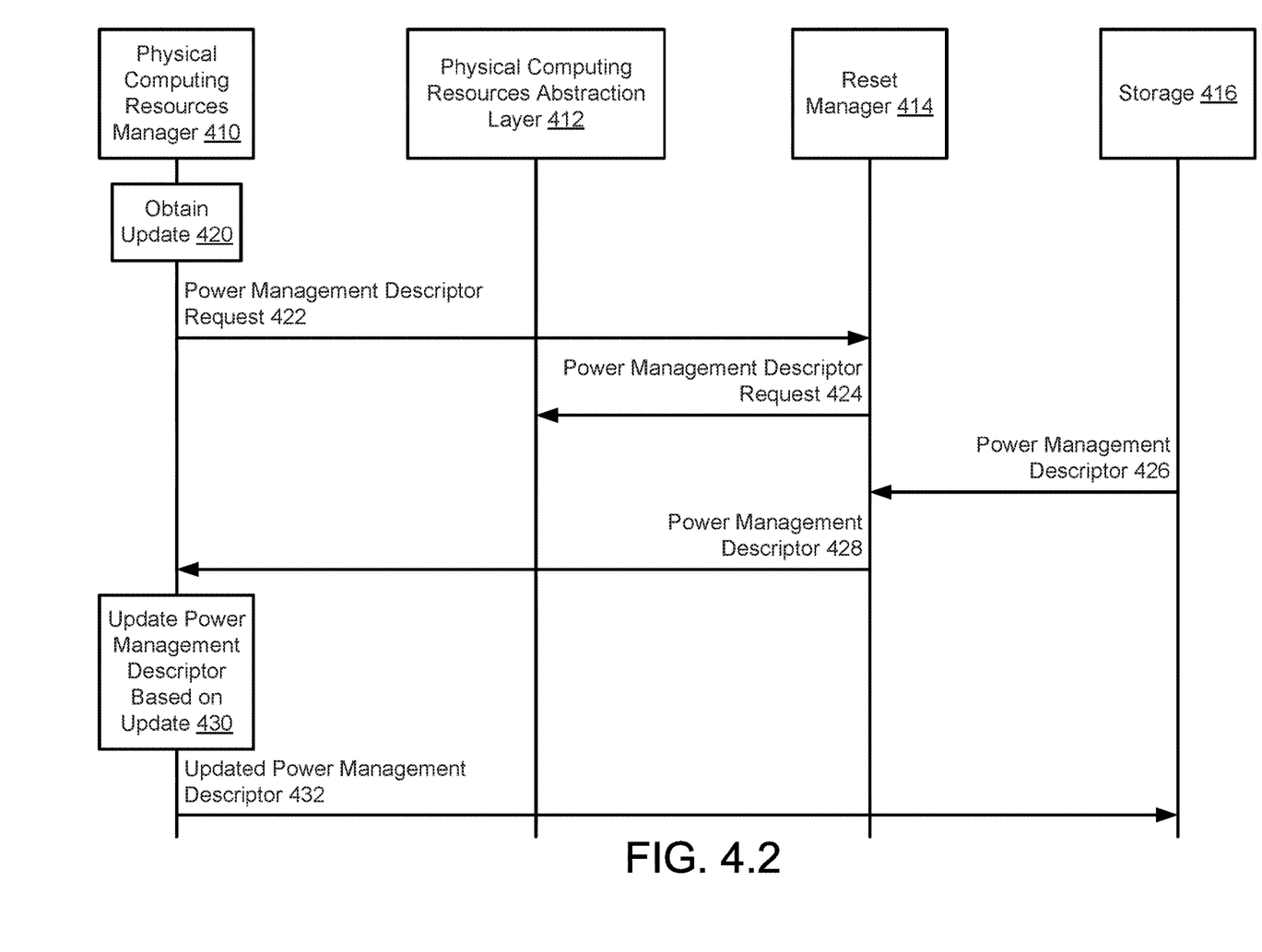
Figure 43:
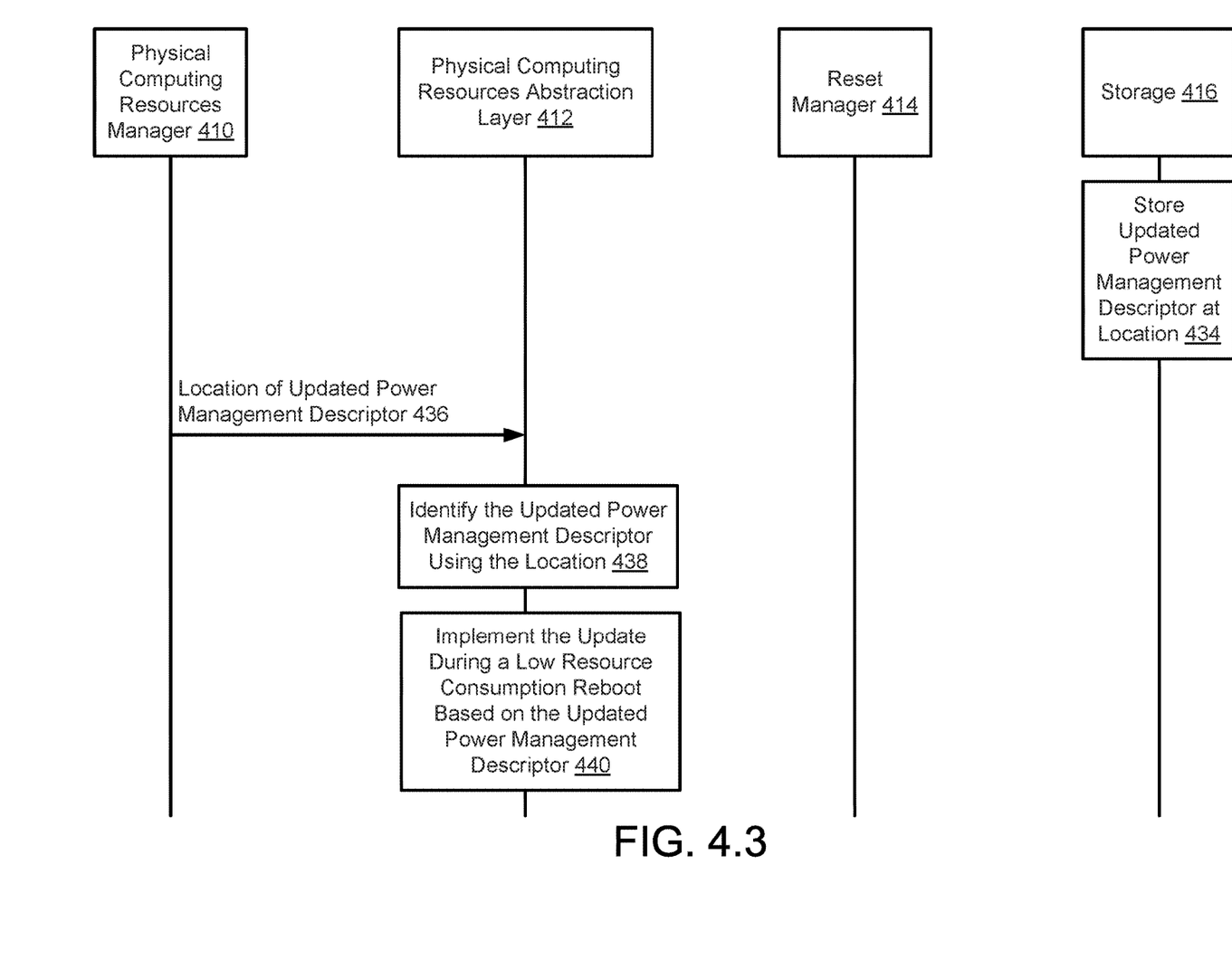

Turning to FIGS. 4.2-4.3, the aforementioned figures illustrate interactions and actions between components of the system of FIG. 4.1. In these figures, the relative occurrence in time of the interactions progresses from the top of each figure (i.e., earlier in time) to the bottom of each figure (i.e., later in time). FIG. 4.3 is a continuation of the diagram of FIG. 4.2. In other words, element 420 indicates the first interaction that occurs in time while element 440 indicates the last interaction that occurs.

Turning to FIG. 4.2, at the first point in time, a physical computing resources manager (410) of the asset (402) obtains the update (420). In response to obtaining the update (420), the physical computing resources manager (410) sends a request for the power management descriptor to a reset manager (414) of an out-of-band manager (not shown) hosted by the asset. In response to obtaining the request (422), the reset manager (414) sends a second power management descriptor request (424) to the physical computing resources abstraction layer (412) of the asset.

In response to the request (424), storage (416) of the asset provides the power management descriptor (426) to the reset manager (414). The reset manager (414), in turn, provides the physical computing resources manager (410) with a copy of the power management descriptor (428).

Once the power management descriptor (428) is obtained, the physical computing resources manager (410) updates the power management descriptor based on the update (430). By doing so, the update is reflected in the updated power management descriptor. The updated power management descriptor (432) is provided to the storage (416). The storage (416) stores the updated power management descriptor at a location (434) which is known to the physical computing resources manager (410).

The physical computing resources manager (410) provides the location of the updated power management descriptor (436) to the physical computing resources abstraction layer (412). By doing so, the updated power management descriptor will be utilized during the new low resource consumption boot of the asset.

When a low resource consumption reboot is going to start (e.g., via a notification from an operating system or other entity indicating a reset of the asset is occurring), the physical computing resources abstraction layer (412) identifies the updated power management descriptor using the location (438) based on the location provided by the physical computing resources manager (410).

The physical computing resources abstraction layer (412) implements the update during a low resource consumption reboot based on the updated power management descriptor (440). Specifically, the updated SSDT table is used as part of an ACPI table by the physical computing resources abstraction layer (412) during the low resource consumption reboot to abstract the manner in which the CPU of the asset is abstracted to the applications for power purposes. By doing so, different operational capabilities will be presented to the applications due to the update now implemented by the abstraction layer.

End of Example

Thus, as illustrated in FIGS. 4.1-4.3, embodiments of the invention may provide a system that enables assets to be efficiently rebooted while still ensuring that updates are applied. For example, proactively modifying an SSDT prior to performing a low resource consumption reboot, the power behavior of the hardware components of the asset may be updated even though a low resource consumption reboot is performed.

Figure 5:
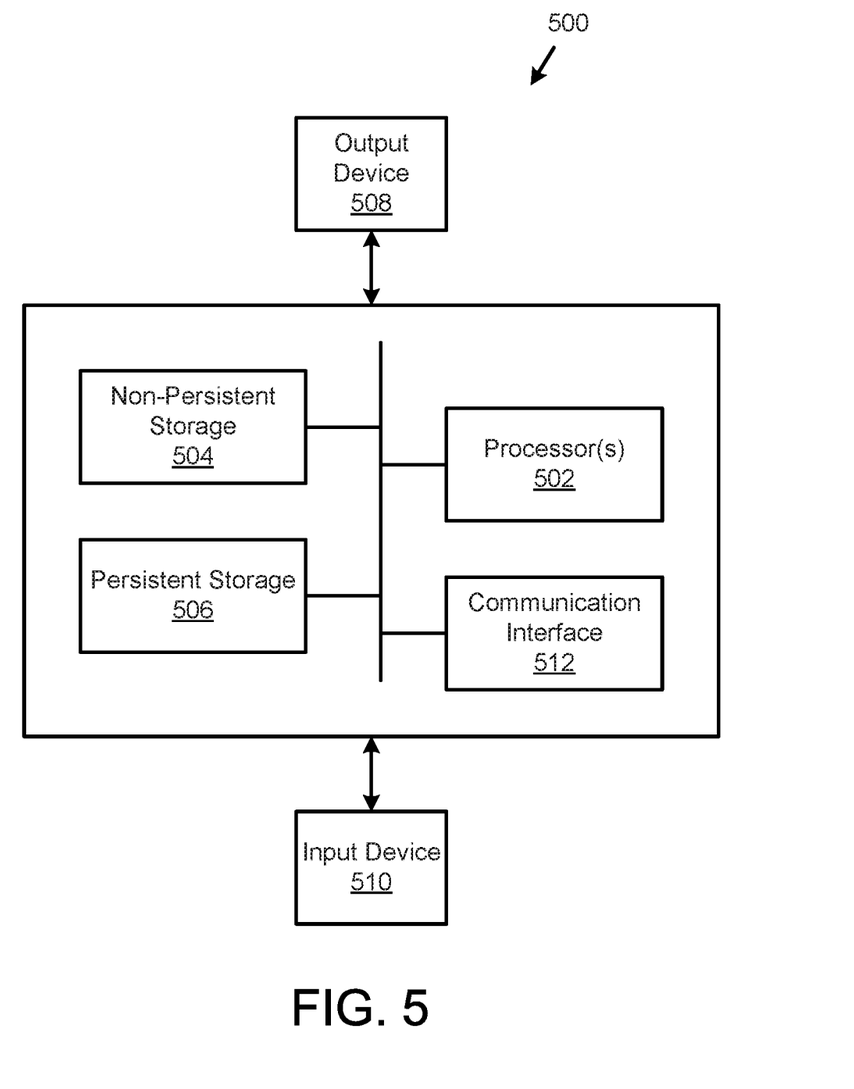
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for performing low resource consumption reboots of devices while ensuring that updates are applied during the low computing resource consumption reboots. To do so, embodiments of the invention may provide a system that proactively takes action, prior to performing low resource consumption reboots, to ensure that updates that are not normally processed during low resource consumption reboots are applied during the low resource consumption reboots. By doing so, the computational cost for performing a reboot may be reduced by avoiding the computational cost for performing a high resource cost reboot while ensuring that updates are applied. Consequently, the (i) computational cost for performing a reboot when updates need to be applied may be reduced, (ii) the time required to perform an update when updates need to be applied may be reduced, (iii) the performance of the system may be improved by automatically ensuring that updates are appropriately applied, and/or (iv) the cognitive burden on users of the system may be reduced by removing the need for users to selectively perform different types of reboots depending on whether updates need to be applied.

Thus, embodiments of the invention may address the problems of limited computing resources in systems that are updated over time and limited cognitive resources of users of the system.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. An asset, comprising:
   physical computing resources; and
   a physical computing resources manager programmed to:
   obtain a power management update for a physical computing resource of the physical computing resources of the asset;
   in response to obtaining the power management update:
   obtain, using an out-of-band manager, a power management descriptor for the asset, wherein the out-of-band manager is a hardware component that is external to the physical computing resource manager, wherein the out-of-band manager comprises second physical computing resources;
   update the power management descriptor based on the power management update to obtain an updated power management descriptor, wherein the power management descriptor is a secondary system descriptor table utilized by a physical computing resources abstraction layer of the asset;
   store the updated power management descriptor at a location in a storage of the asset; and
   initiate a low resource consumption reboot by the physical computing resources abstraction layer, wherein the physical computing resources abstraction layer uses the location to implement the power management update, wherein the physical computing resources abstraction layer obtains the location from the physical computing resources manager.

2. The asset of claim 1, wherein implementing the power management update changes a manner in which the physical computing resource is powered during operation of the asset.

3. The asset of claim 1, wherein the power management update specifies a change in a quantity of power to be provided to the physical computing resource during operation of the asset.

4. The asset of claim 1, wherein the out-of-band manager operates independently of the asset.

5. The asset of claim 1, wherein performing the low resource consumption reboot does not include updating of the power management descriptor.

6. A method for managing an asset, comprising:
   obtaining a power management update for a physical computing resource of physical computing resources of the asset;
   in response to obtaining the power management update:
   obtaining, using an out-of-band manager, a power management descriptor for the asset, wherein the out-of-band manager is a hardware component that is external to the physical computing resource manager, wherein the out-of-band manager comprises second physical computing resources;
   updating the power management descriptor based on the power management update to obtain an updated power management descriptor, wherein the power management descriptor is a secondary system descriptor table utilized by a physical computing resources abstraction layer of the asset;

storing the updated power management descriptor at a location in a storage of the asset; and initiating a low resource consumption reboot by the physical computing resources abstraction layer, wherein the physical computing resources abstraction layer uses the location to implement the power management update, wherein the physical computing resources abstraction layer obtains the location from the physical computing resources manager.

7. The method of claim 6, wherein implementing the power management update changes a manner in which the physical computing resource is powered during operation of the asset.

8. The method of claim 6, wherein the power management update specifies a change in a quantity of power to be provided to the physical computing resource during operation of the asset.

9. The method of claim 6, wherein the out-of-band manager operates independently of the asset.

10. The method of claim 6, wherein performing the low resource consumption reboot does not include updating of the power management descriptor.

11. A non-transitory computer readable medium comprising computer readable program code, which when executed by a computer processor enables the computer processor to perform a method for managing an asset, the method comprising:

obtaining a power management update for a physical computing resource of physical computing resources of the asset;

in response to obtaining the power management update:
  obtaining, using an out-of-band manager, a power management descriptor for the asset, wherein the out-of-band manager is a hardware component that is external to the physical computing resource manager, wherein the out-of-band manager comprises second physical computing resources;

updating the power management descriptor based on the power management update to obtain an updated power management descriptor, wherein the power management descriptor is a secondary system descriptor table utilized by a physical computing resources abstraction layer of the asset;

storing the updated power management descriptor at a location in a storage of the asset; and initiating a low resource consumption reboot by the physical computing resources abstraction layer, wherein the physical computing resources abstraction layer uses the location to implement the power management update, wherein the physical computing resources abstraction layer obtains the location from the physical computing resources manager.

12. The non-transitory computer readable medium of claim 11, wherein implementing the power management update changes a manner in which the physical computing resource is powered during operation of the asset.

13. The non-transitory computer readable medium of claim 11, wherein the out-of-band manager operates independently of the asset.

14. The non-transitory computer readable medium of claim 11, wherein performing the low resource consumption reboot does not include updating of the power management descriptor.

* * * * *